United States Patent
Beaudoin et al.

(10) Patent No.: US 10,661,319 B2
(45) Date of Patent: May 26, 2020

(54) GAS VENTILATION AND LEACHATE DRAIN ASSEMBLAGE FOR LANDFILL

(71) Applicant: Republic Services, Inc., Phoenix, AZ (US)

(72) Inventors: Michael Beaudoin, Fountain Hills, AZ (US); David Penoyer, Phoenix, AZ (US)

(73) Assignee: Republic Services, Inc., Phoenix, AZ (US)

( * ) Notice: Subject to any disclaimer, the term of this patent is extended or adjusted under 35 U.S.C. 154(b) by 0 days.

(21) Appl. No.: 16/225,480

(22) Filed: Dec. 19, 2018

(65) Prior Publication Data

US 2019/0201950 A1    Jul. 4, 2019

Related U.S. Application Data

(60) Provisional application No. 62/611,170, filed on Dec. 28, 2017.

(51) Int. Cl.
| | | |
|---|---|---|
| *B09B 1/00* | (2006.01) | |
| *E02D 29/02* | (2006.01) | |
| *E21B 43/08* | (2006.01) | |
| *E21B 43/04* | (2006.01) | |

(52) U.S. Cl.
CPC .............. *B09B 1/006* (2013.01); *B09B 1/00* (2013.01); *E02D 29/0208* (2013.01); *E21B 43/04* (2013.01); *E21B 43/08* (2013.01)

(58) Field of Classification Search
CPC ........... B09B 1/00; B09B 1/004; B09B 1/006; B09B 1/008

USPC .............. 405/129.57, 129.7, 129.85, 129.95
See application file for complete search history.

(56) References Cited

U.S. PATENT DOCUMENTS

| | | | | |
|---|---|---|---|---|
| 4,425,743 A | * | 1/1984 | Bartur .................... | B65D 88/76 52/169.5 |
| 4,469,176 A | | 9/1984 | Zison et al. | |
| 4,526,615 A | * | 7/1985 | Johnson .................... | C22B 3/04 299/5 |
| 4,580,925 A | * | 4/1986 | Matich ..................... | B09B 1/00 376/272 |
| 4,672,691 A | * | 6/1987 | De Garie ................. | B09B 1/00 210/218 |
| 4,696,599 A | * | 9/1987 | Rakoczynski ........ | E02D 31/004 210/170.01 |
| 4,844,840 A | * | 7/1989 | Feizollahi ................ | G21F 9/36 588/17 |
| 4,849,360 A | * | 7/1989 | Norris ..................... | B09C 1/10 435/264 |

(Continued)

FOREIGN PATENT DOCUMENTS

| | | |
|---|---|---|
| CN | 201760436 | 3/2011 |
| CN | 102191166 | 9/2011 |

(Continued)

*Primary Examiner* — Frederick L Lagman
(74) *Attorney, Agent, or Firm* — Ballard Spahr LLP

(57) ABSTRACT

An assemblage of containers holding a porous medium is established in a landfill in fluid communication with a leachate drainage layer. A gas extraction well is drilled through the waste matter layers of the landfill into the assemblage. The assemblage augments gas flow throughout the landfill to the gas extraction well and drainage of leachate percolating through the landfill to the leachate drainage layer.

43 Claims, 9 Drawing Sheets

(56) References Cited

U.S. PATENT DOCUMENTS

| | | | | |
|---|---|---|---|---|
| 4,946,310 | A * | 8/1990 | Wunderatzke | B09B 1/006 210/497.1 |
| 5,201,609 | A * | 4/1993 | Johnson | B09B 1/00 405/129.7 |
| 5,215,660 | A * | 6/1993 | Mosher | F25B 43/003 210/283 |
| 5,421,671 | A * | 6/1995 | Lewis | B09C 1/002 405/52 |
| 5,599,139 | A * | 2/1997 | Chewning | B09B 1/00 405/129.6 |
| 5,846,024 | A * | 12/1998 | Mao | B09B 1/00 405/129.7 |
| 5,857,807 | A * | 1/1999 | Longo, Sr. | B09B 1/00 166/369 |
| 6,102,617 | A * | 8/2000 | Hampton | G01M 3/005 405/129.5 |
| 6,283,676 | B1 * | 9/2001 | Hater | B09B 1/00 210/747.1 |
| 6,543,189 | B1 * | 4/2003 | Wood, Jr. | E04B 1/7023 405/129.7 |
| 6,688,812 | B2 * | 2/2004 | Rowe | B09B 1/00 405/129.7 |
| 7,670,082 | B2 | 3/2010 | Olsta et al. | |
| 8,262,318 | B2 | 9/2012 | Olsta et al. | |
| 2004/0062610 | A1 * | 4/2004 | Hater | B09B 1/00 405/129.95 |
| 2005/0201831 | A1 * | 9/2005 | Lee | B09B 1/00 405/129.95 |
| 2009/0014380 | A1 * | 1/2009 | Houck | E02B 11/005 210/417 |
| 2010/0189506 | A1 * | 7/2010 | Houck | E03F 1/002 405/43 |
| 2016/0089706 | A1 * | 3/2016 | Read | C02F 11/14 405/129.57 |
| 2016/0101942 | A1 * | 4/2016 | Hinchberger | B65G 5/00 405/129.75 |
| 2016/0279555 | A1 * | 9/2016 | Anderson | B09B 1/00 |

FOREIGN PATENT DOCUMENTS

| | | | |
|---|---|---|---|
| CN | 202247948 | | 5/2012 |
| CN | 202824070 | | 3/2013 |
| CN | 203320575 | | 12/2013 |
| CN | 204769833 | | 11/2015 |
| CN | 105318339 | | 2/2016 |
| CN | 205146871 | | 4/2016 |
| CN | 105821909 | | 8/2016 |
| CN | 106216343 | | 12/2016 |
| CN | 205887632 | | 1/2017 |
| CN | 206752618 | * | 12/2017 |
| EP | 042973 | | 11/1990 |
| EP | 2361698 | | 7/2009 |
| KR | 2005012870 | * | 2/2005 |
| KR | 2005012882 | * | 2/2005 |
| WO | 2012157947 | | 11/2012 |
| WO | WO-2012157947 A2 * | 11/2012 | ............... B09B 1/00 |

* cited by examiner

GAS VENTILATION AND LEACHATE DRAIN ASSEMBLAGE FOR LANDFILL

CROSS REFERENCE TO RELATED APPLICATION

This application is based upon and claims priority to U.S. Provisional Application No. 62/611,170, filed Dec. 28, 2017 and hereby incorporated by reference.

FIELD OF THE INVENTION

This invention relates to structures for augmenting gas extraction and leachate drainage in landfills.

BACKGROUND

Landfills, in particular those used for the disposal of municipal waste, generate significant amounts of gas as the waste matter within the landfill breaks down. Greenhouse gases, such as methane and carbon dioxide, comprise a large constituent of the gas, and result from the breakdown of cellulosic material, for example, paper, wood, yard waste as well as other organic matter. Landfills also produce large quantities of leachate. Leachate is caused primarily by precipitation (rainwater) percolating through the waste deposited in the landfill. Other sources of leachate derive from the biological breakdown of waste matter in the landfill as well as the recirculation of leachate and other liquids through the landfill. In the course of passing through the waste matter, the various liquids extract soluble or suspended solids, as well as other components of the decomposing matter. To prevent the leachate from contaminating the groundwater, expensive and sophisticated impermeable liners are installed between the waste matter and the soil underlying the landfill.

Challenges faced by landfill designers and operators include efficient and thorough removal and treatment of gaseous by-products to mitigate or prevent gas discharge to the atmosphere and environmentally responsible collection and treatment of the leachate to prevent groundwater pollution, while maintaining stability of the landfill and protecting the integrity of the liner. These challenges become more acute as the depth of landfills increase in response to ever greater expenses associated with constructing and operating landfills. There is clearly a need for structures which provide for the efficient draining of leachate and for the thorough extraction of gases from all levels of the landfill.

SUMMARY

The invention concerns an assemblage for promoting ventilation and drainage within a landfill. In an example embodiment the assemblage comprises a plurality of porous containers arranged one atop another in a plurality of container layers including at least a base layer and a top layer positioned above the base layer. Each container holds a porous medium. At least one vent channel is positioned among the containers and extends between at least two of the container layers. The embodiment may further comprise at least one drain channel positioned beneath the base layer. The at least one drain channel is arranged transversely to and in fluid communication with the at least one vent channel. In a specific example embodiment the at least one vent channel comprises a perforated pipe. Further by way of example, the at least one drain channel comprises a perforated pipe. Another example embodiment further comprises a plurality of vent channels distributed among the containers. An example embodiment may further comprise a plurality of drain channels positioned beneath the base layer, each of the drain channels being arranged transversely to and in fluid communication with at least one of the vent channels. In a particular example the vent channels and the drain channels comprise perforated pipe.

In an example embodiment, each porous container comprises a wire cage. The porous medium may be selected from the group consisting of gravel, cobble and combinations thereof. In an example embodiment the porous medium may range in size from ½ inch to 6 inches in diameter.

By way of example, an embodiment may further comprise a substrate surrounding at least the base layer. In a specific example embodiment the substrate comprises a geotextile. Further by way of example, a substrate overlies the top layer. In an example embodiment, the substrate comprises a geotextile. In an example embodiment, the containers are arranged in a cubic shape. Further by way of example, an embodiment may comprise at least two container layers between the base layer and the top layer.

The invention also encompasses a landfill. In an example embodiment, the landfill comprises a leachate drainage layer. A plurality of porous containers are arranged one atop another in a plurality of container layers including at least a base layer positioned on a portion of the leachate drainage layer, and a top layer positioned above the base layer. Each container holds a porous medium. At least one vent channel may be positioned among the containers and extend between the leachate drainage layer and at least two of the container layers. A further example embodiment comprises at least one drain channel positioned between the base layer and the leachate drainage layer. The at least one drain channel is arranged transversely to and in fluid communication with the at least one vent channel by way of example.

In an example embodiment, the leachate drainage layer is formed of material selected from the group consisting of fine sand, gravel, glass particles, rubber particles and combinations thereof. An example embodiment may further comprise an impermeable membrane positioned beneath the leachate drainage layer. In a particular example the impermeable membrane comprises high density polyethylene. In an example embodiment a soil layer covers the leachate drainage layer. Another example comprises a substrate surrounding at least the base layer, the substrate being positioned between the soil layer and the base layer. In a particular example the substrate comprises a geotextile.

An example landfill may further comprise a porous layer surrounding the base layer. The porous layer is positioned between the soil layer and the leachate drainage layer. By way of example the porous layer may comprise a layer of non-carbonate stones. In an example embodiment at least one drain channel extends into the porous layer. An example embodiment may further comprise a substrate overlying the top layer. The substrate may comprises a geotextile for example.

In a particular example the at least one vent channel comprises a perforated pipe. Further by way of example, the at least one drain channel comprises a perforated pipe. An example embodiment may further comprise a plurality of vent channels distributed among the containers. A plurality of drain channels may be positioned beneath the base layer in an example. Each of the drain channels are arranged transversely to and in fluid communication with at least one of the vent channels in an example embodiment. In a particular example the vent channels and the drain channels comprise perforated pipe. In another example, each porous container comprises a wire cage. By way of example the porous medium may be selected from the group consisting of gravel, cobble and combinations thereof. In an example embodiment the porous medium may range in size from ½ inch to 6 inches in diameter. An example embodiment may comprise at least two container layers between the base layer and the top layer.

An example embodiment further comprises a waste matter layer covering the leachate drainage layer and the top layer. A gas extraction well extends from a surface of the waste matter layer to the top layer. By way of example the waste matter layer comprises a shaft extending through the waste matter layer. A pipe is positioned within the shaft. The pipe is in fluid communication with the leachate bed through the container layers. A porous medium is positioned within the shaft surrounding the pipe. In an example embodiment the porous medium comprises gravel.

DETAILED DESCRIPTION

Figure 1:
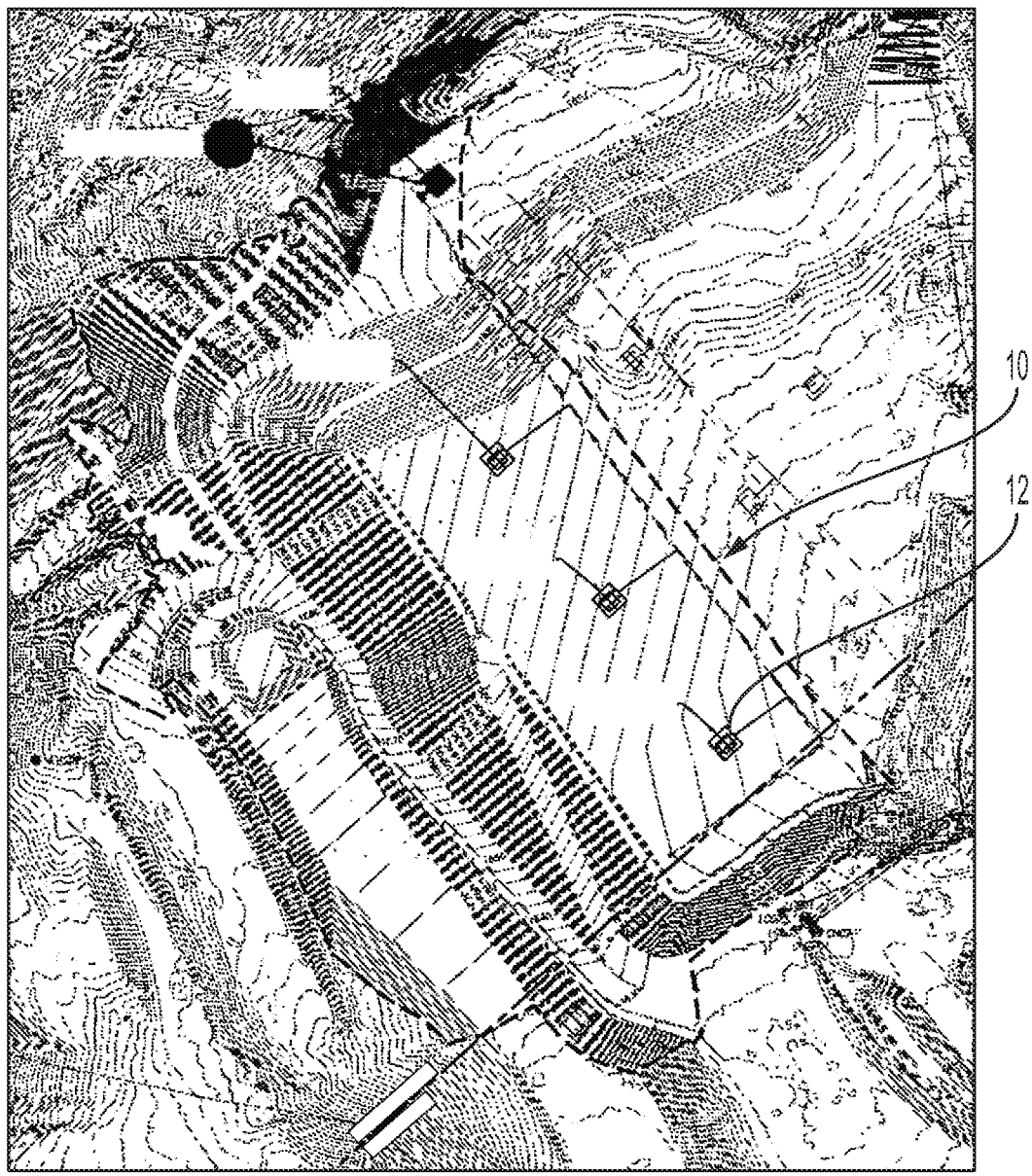
FIG. 1 is a topographical plan representation of an example landfill according to the invention.

FIG. 1 is a topographical representation of an example landfill 10 according to the invention. One or more assemblages 12 for promoting ventilation and drainage are located at spaced locations within the landfill 10.

Figure 2:
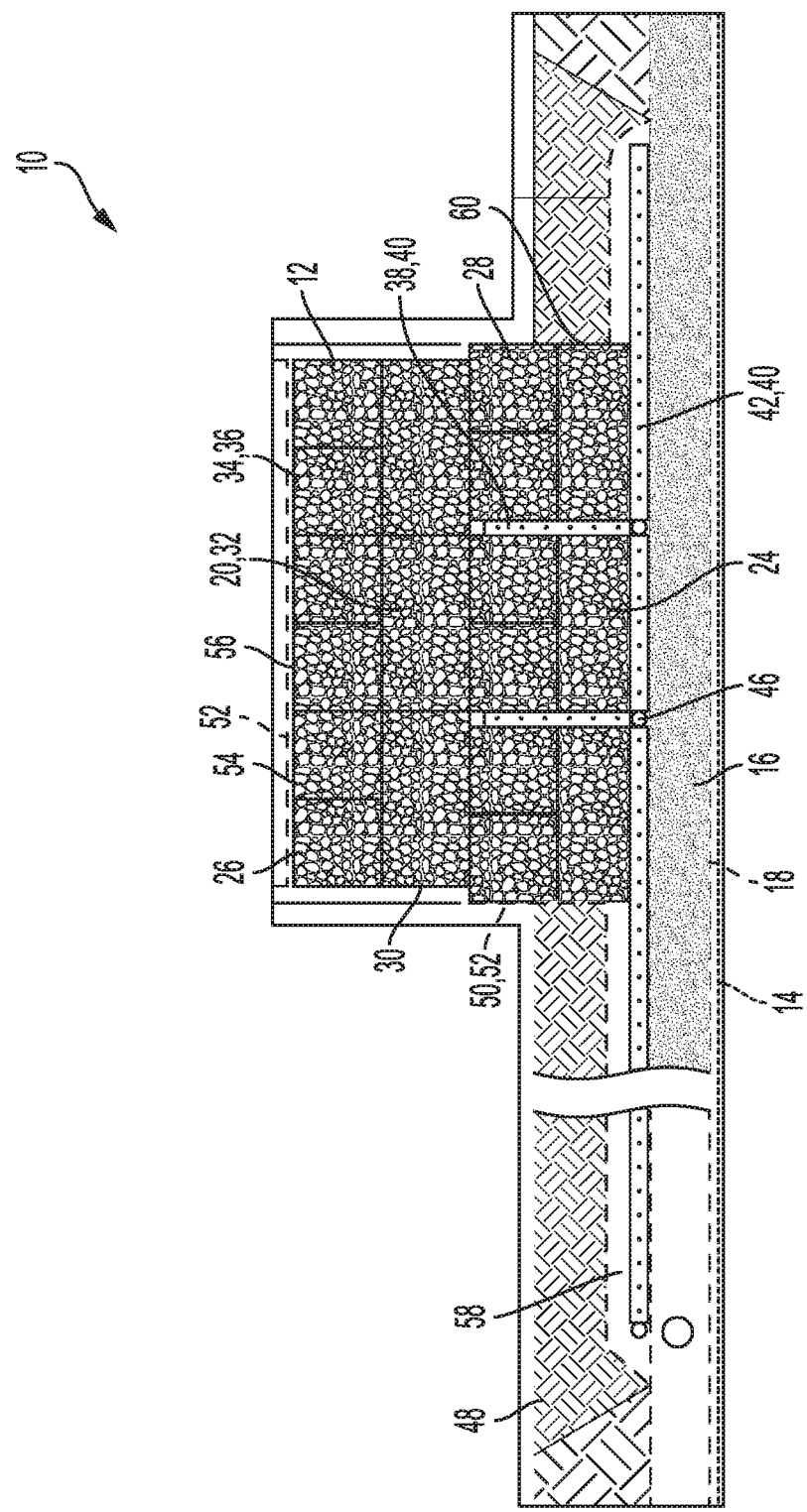
FIG. 2 is an elevational sectional view of a portion of the landfill shown in FIG. 1.

FIG. 2 shows a sectional view of the landfill 10 and an example assemblage 12 according to the invention. In this example, the landfill 10 comprises an impermeable membrane 14 positioned beneath a leachate drainage layer 16. In a practical design the membrane 14 may comprise a high density polyethylene geomembrane protected by a porous flexible substrate such as a geotextile layer 18. The leachate drainage layer 16 may comprise a range of material from fine sand to coarse gravel. Other materials feasible for the leachate drainage layer include glass or rubber particles.

Figure 3:
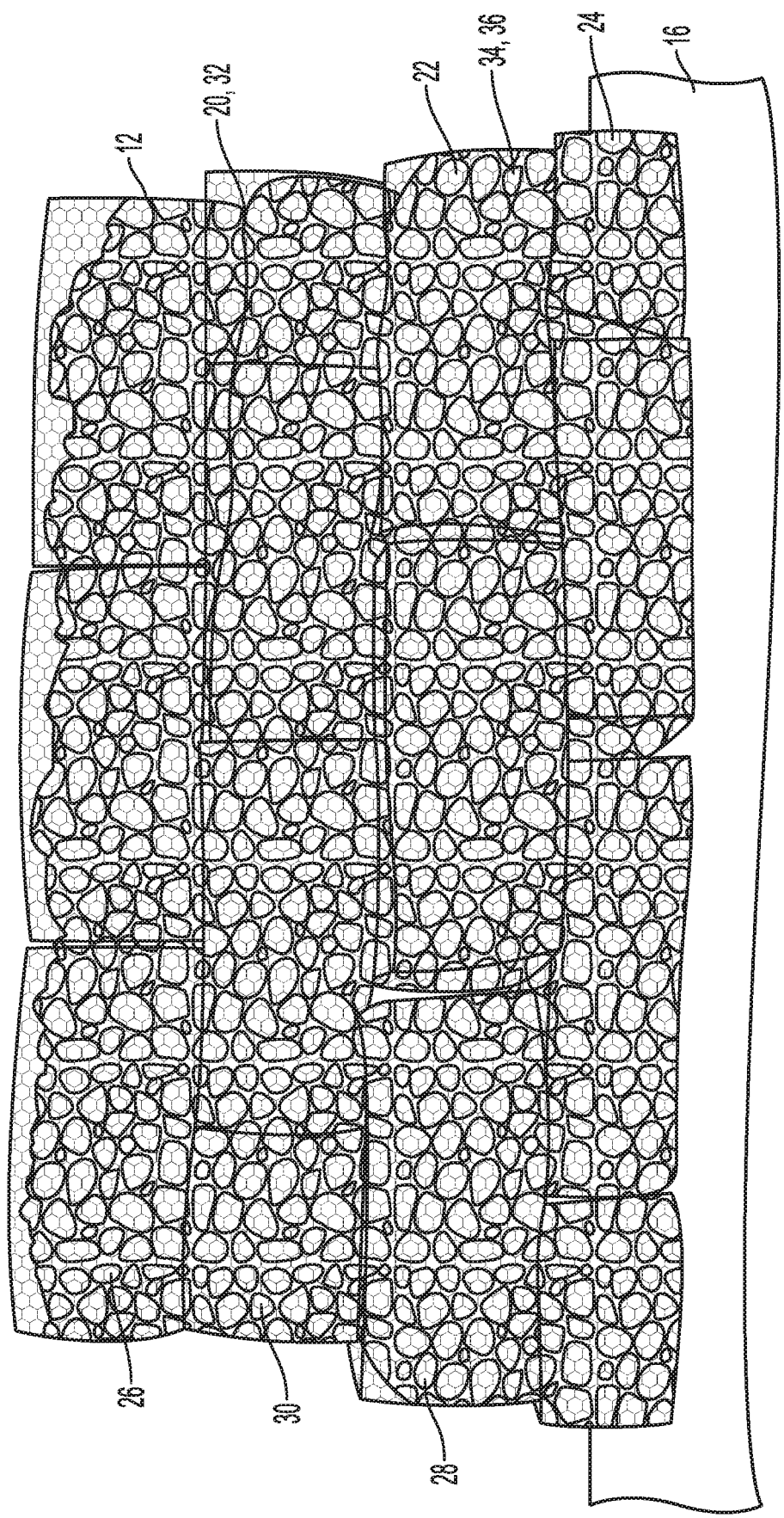
FIG. 3 is an elevational view of an example assemblage used with the landfill shown in FIG. 1.
Figure 4:
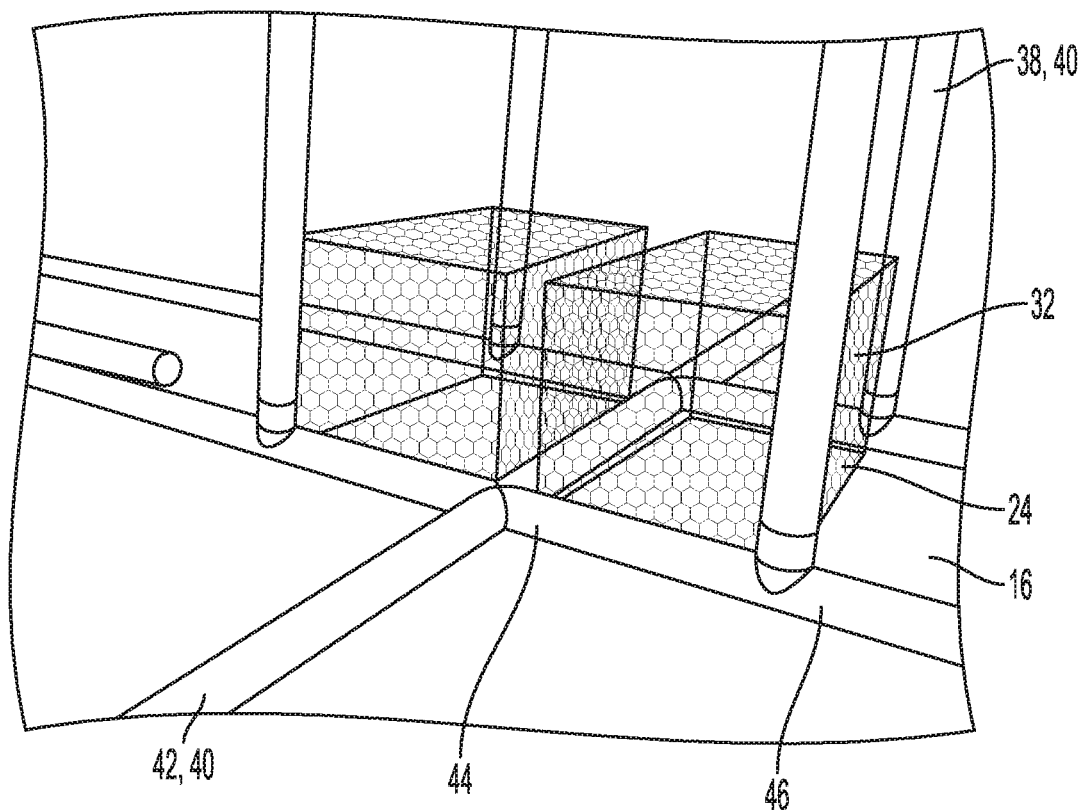
FIGS. 4-6 are isometric views of an interior portion of the assemblage shown in FIG. 3 while under construction.
Figure 5:
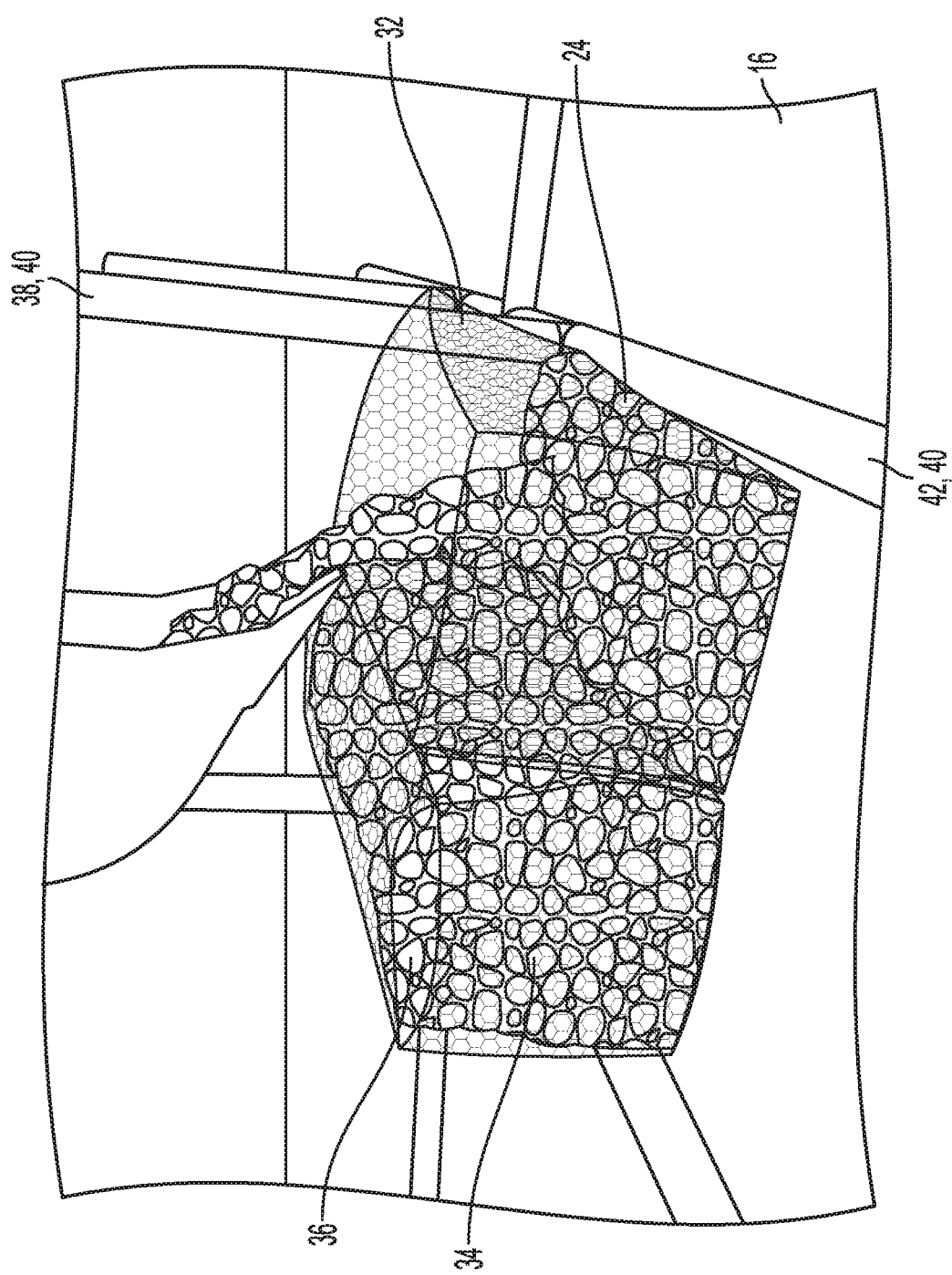

As shown in FIGS. 2 and 3, an example assemblage 12 comprises a plurality of porous containers 20 arranged atop one another in a plurality of container layers 22. In this example, the assemblage 12 comprises a base layer 24, a top layer 26 positioned above the base layer 24 and two intermediate container layers 28 and 30 located between the base and top layers. Containers 20 are arranged in a cubic shape in this example assemblage 12. In an example embodiment, the containers 20 comprise wire cages 32, commonly referred to as "gabions". As shown in FIGS. 4 and 5, the gabions 32 of base layer 24 are positioned on the leachate drainage layer 16 and filled with a porous medium 34. In an example embodiment the porous medium may range from coarse gravel to cobble, ranging in size from approximately ½ inch to 6 inches in diameter. In a practical design, the gabions 32 have an oblong shape with dimensions of 3×3×6 feet and the gravel 36 ranges in size from about 2 to about 6 inches in diameter. Intermediate container layers 28 and 30 and top layer 26 are similarly arranged on the base layer 24 by first positioning the gabions 32 and then filling them with the porous medium 34. Positioning the base layer 24 directly on the leachate drainage layer 16 ensures that the assemblage 12 will be in fluid communication with the leachate drainage layer when in operation as described below.

As shown in FIGS. 2 and 4-6, porosity of assemblage 12 is advantageously augmented though the use of vent channels 38 positioned among the gabions 32 and extending between the container layers. In this example, the vent channels 38 comprise perforated pipes 40 made of high density polyethylene, with the pipes 40 extending between the base layer 24 and the first intermediate container layer 28. In a practical example the pipes 40 have a diameter of 6 inches with ½ inch diameter perforations of the pipe sidewall positioned in spaced relation along the pipe's length. The pipes 40 comprising the vent channels 38 may be capped to prevent clogging.

Figure 6:
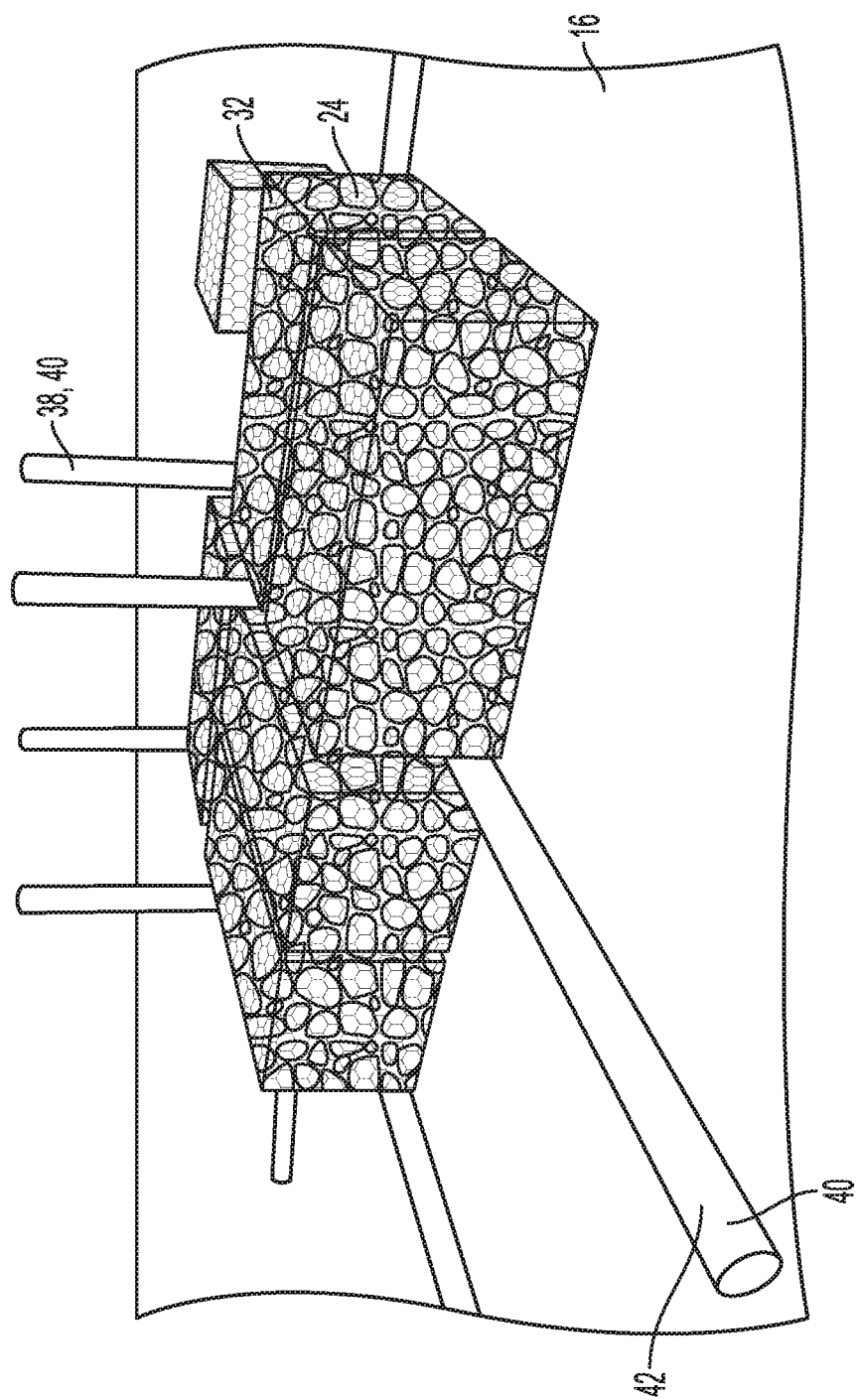

Porosity of assemblage 12 is further increased by the use of drain channels 42 positioned between the base layer 24 and the leachate drainage layer 16. In the example shown in FIG. 4 the drain channels 42 comprise high density perforated polyethylene pipes 40 arranged transversely to the vent channels 38. The drain channels 42 are in fluid communication with one another via cruciform fittings 44 and in fluid communication with the vent channels 38 via "tee" fittings 46 (see FIG. 4). As illustrated in FIGS. 4-6, the gabions 32 are positioned surrounding the vent channels 38 and the drain channels 42 and then filled with the porous medium 34.

Figure 7:
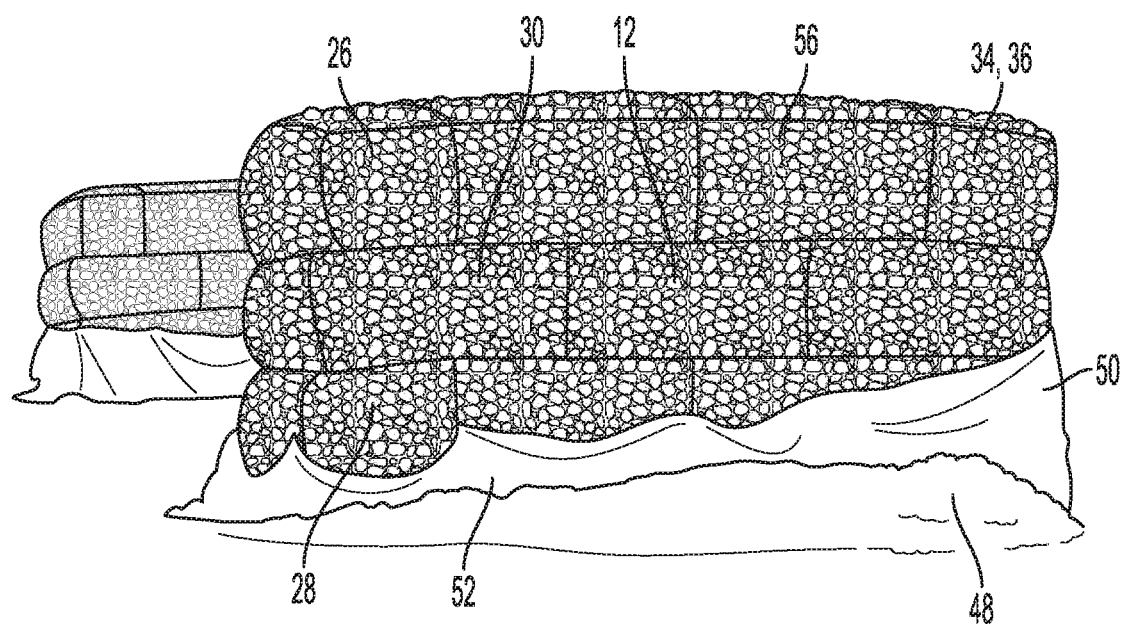
FIG. 7 is an isometric view of a portion of the landfill shown in FIG. 1 with example assemblages as shown in FIGS. 2-6.

As shown in FIGS. 2 and 7, a soil layer 48 may cover the leachate drainage layer 16, but note that the base layer 24 of the assemblage 12 is in direct contact with the leachate drainage layer, the soil layer 48 lapping against the side of the base layer 24 and part of the first intermediate container layer 28 in this example. A porous, flexible substrate 50 surrounds at least the base layer 24 and, as shown, extends above the soil layer to surround the first intermediate container layer 28. In the example shown, the substrate 50 comprises a geotextile 52 positioned between the soil layer 48 and the sides of the base layer 24, the substrate 50 surrounding the base layer 24. Another porous, flexible substrate layer 54 may overlie the upper surface 56 of the top layer 26. In this example the substrate layer 54 is also a geotextile 52.

Figure 8:
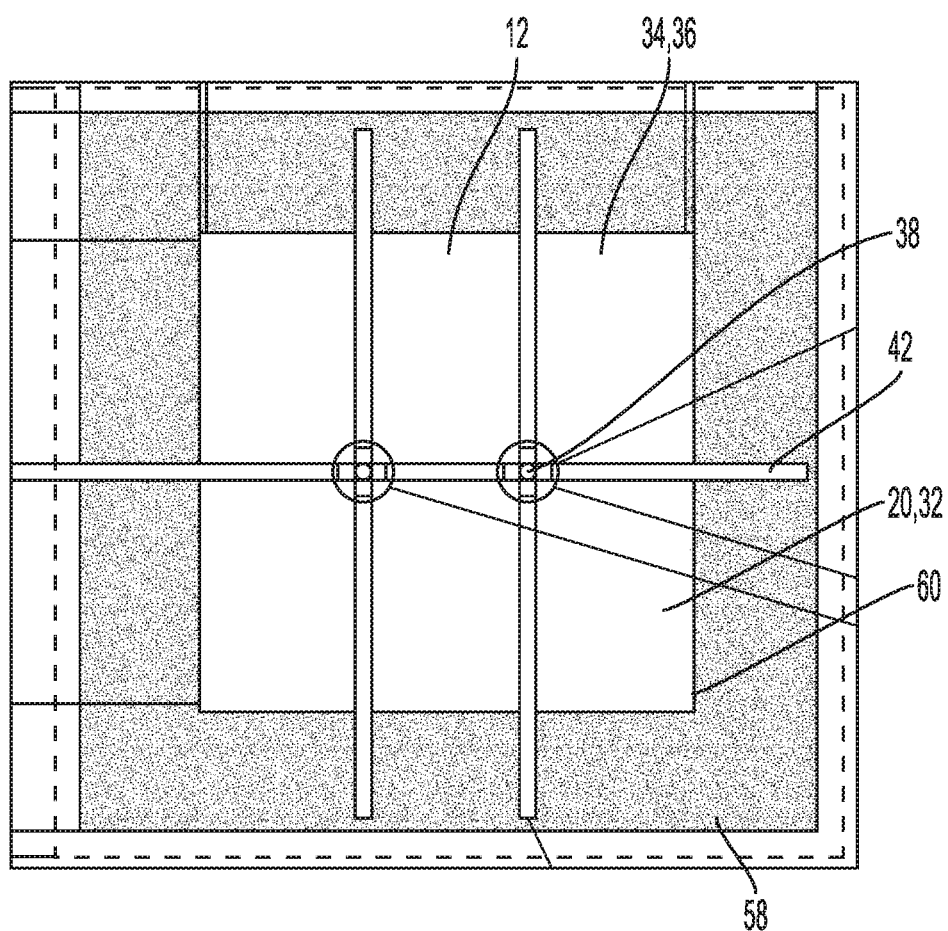
FIG. 8 is a plan view of a portion of the landfill shown in FIG. 1 from a position above an assemblage shown in FIG. 7.

As shown in FIGS. 2 and 8, a porous layer 58 surrounds the base layer 24. The porous layer 58 is positioned between the soil layer 48 and the leachate drainage layer 16 and extends outwardly from the assemblage perimeter 60. For a cube-shaped assemblage as shown, having sides of about 19 feet in length, it is advantageous that the porous layer extend a minimum of about 5 feet from the perimeter 60. The porous layer 58 may comprise non-carbonate stones, AASHTO No. 57 for example. It is further advantageous to extend one or more of the drain channels 42 into the porous layer 58.

Figure 9:
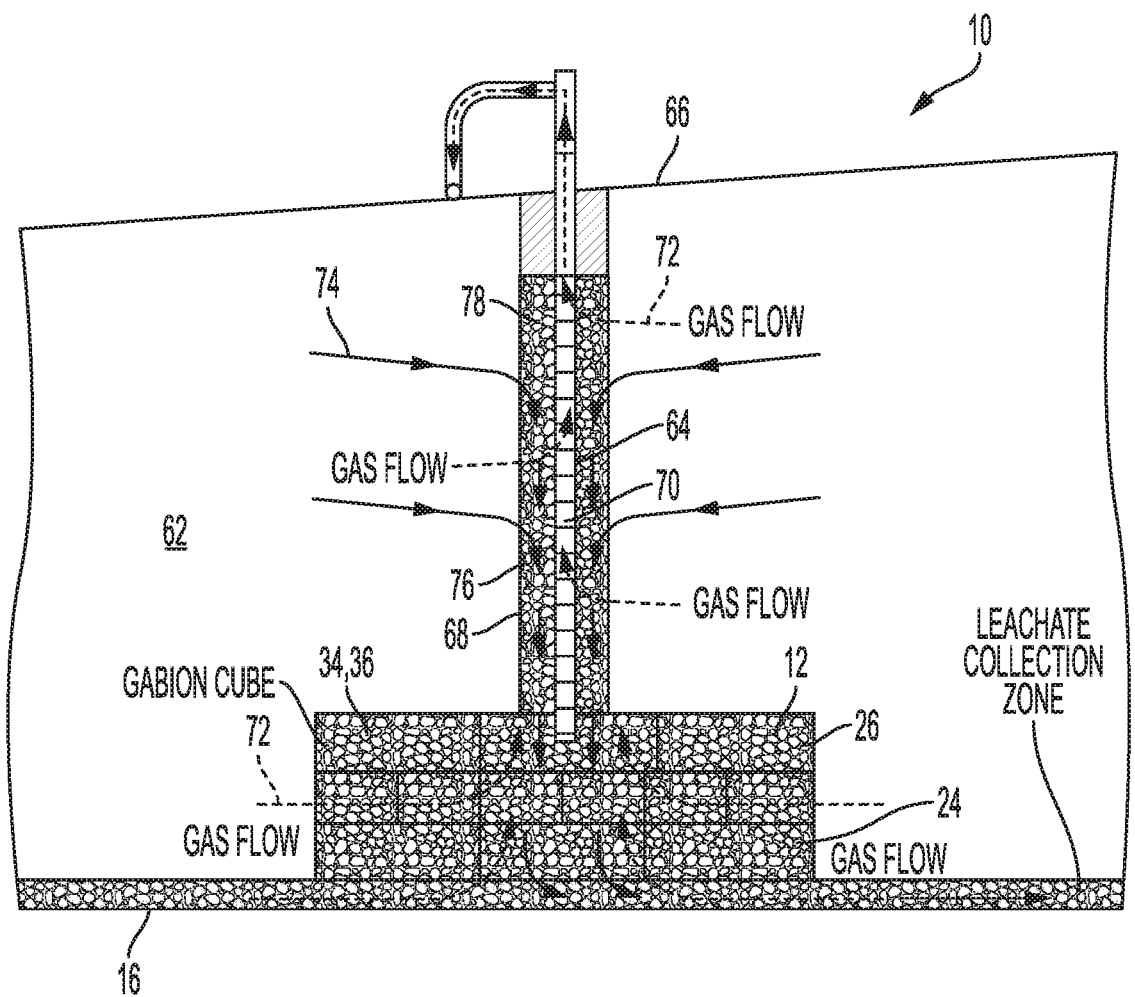
FIG. 9 is a schematic sectional view of an example landfill illustrating the assemblage of FIGS. 2-8 in operation.

Operation of the assemblage 12 within the landfill 10 is illustrated in FIG. 9. Waste matter is distributed throughout the landfill forming a layer 62 covering the leachate drainage layer 16 and surrounding and covering the assemblage 12 to a particular depth. A gas extraction well 64 is drilled from the surface 66 of the waste matter layer into the top layer 26 of the assemblage. In an example embodiment, the gas extraction well 64 may comprise a shaft 68 extending through the waste matter layer 62. An extraction pipe 70 is positioned within the shaft 68, with the extraction pipe extending at least into the top layer 26 and thereby gaining fluid communication with the leachate drainage layer 16 through the porous container layers 24 and 26 and any intermediate layers of the assemblage 12. In a practical example, the shaft 68 may be 36 inches in diameter and the extraction pipe 70 may be 8 inches in diameter. One or more pumps (not shown) connected to the extraction pipe 70 may be used to draw gaseous by-products 72 from the landfill 10. The gaseous by-products 72, resulting from decay of the waste matter in the waste matter layer 62, comprise in significant part, methane. The methane may be burned in situ as a waste gas, or burned to produce useable energy, or compressed and transported for use elsewhere as an energy source. The gaseous by-products are naturally drawn to the assemblage 12 as they diffuse through the landfill because the assemblage presents a low-resistance path to the surface, with the natural flow being augmented by the draw of the pumps. The assemblage 12 draws gaseous by-product from distances throughout the landfill because it is in fluid communication with the leachate drainage layer 16, itself a relatively porous layer which traverses the entire subsurface area of the landfill 10.

Simultaneously, leachate 74, which finds its way into the landfill from natural surface precipitation (rain, snow) or from the waste matter of the waste matter layer 62, is also naturally drawn to the assemblage 12, again because it presents a low-resistance path, this time to the leachate drainage layer 16 with which it is in fluid communication. The leachate drainage layer 16 is sloped so that the leachate drains to a low point of the landfill 10 where it may be pump out and treated. Note that the shaft 68 comprises a porous medium 76, in this example gravel 78 back filled into the shaft 68 and surrounding the extraction pipe 70. This permits the extraction well 64 itself to further augment the flow of both gas and leachate through the waste matter layer 62.

As the waste matter layer 62 builds to greater depth with the addition of waste matter, the gas extraction well 64 may be extended using well extension techniques.

Assemblages 12 according to the invention are expected to improve top to bottom fluid communication in landfills and thereby mitigate or eliminate problems such as odor emissions, poor leachate drainage, heat accumulation, and instability of the waste matter layer.

What is claimed is:

1. An assemblage for promoting ventilation and drainage within a landfill, said assemblage comprising:
   a plurality of porous containers arranged directly one atop another in a plurality of container layers including at least a base layer and a top layer positioned above said base layer, each said container holding a porous medium;
   at least one vent channel positioned among said containers and extending between at least two of said container layers; wherein said assemblage is configured to be used within said landfill.

2. The assemblage according to claim 1, further comprising at least one drain channel positioned beneath said base layer, said at least one drain channel being arranged transversely to and in fluid communication with said at least one vent channel.

3. The assemblage according to claim 2, wherein said at least one drain channel comprises a perforated pipe.

4. The assemblage according to claim 1, wherein said at least one vent channel comprises a perforated pipe.

5. The assemblage according to claim 1, further comprising a plurality of said vent channels distributed among said containers.

6. The assemblage according to claim 5, further comprising a plurality of drain channels positioned beneath said base layer, each of said drain channels being arranged transversely to and in fluid communication with at least one of said vent channels.

7. The assemblage according to claim 6, wherein said vent channels and said drain channels comprise perforated pipe.

8. The assemblage according to claim 1, wherein each said porous container comprises a wire cage.

9. The assemblage according to claim 1, wherein said porous medium is selected from the group consisting of gravel, cobble and combinations thereof.

10. The assemblage according to claim 9, wherein said porous medium ranges in size from ½ inch to 6 inches in diameter.

11. The assemblage according to claim 1, further comprising a substrate surrounding at least said base layer.

12. The assemblage according to claim 11, wherein said substrate comprises a geotextile.

13. The assemblage according to claim 1, further comprising a substrate overlying said top layer.

14. The assemblage according to claim 13, wherein said substrate comprises a geotextile.

15. The assemblage according to claim 1, wherein said containers are arranged in a cubic shape.

16. The assemblage according to claim 1, further comprising at least two container layers between said base layer and said top layer.

17. The assemblage according to claim 1, further comprising at least one container layer between said base layer and said top layer.

18. A landfill, comprising:
   a leachate drainage layer;
   a plurality of porous containers arranged directly one atop another in a plurality of container layers including at least a base layer positioned on a portion of said leachate drainage layer, and a top layer positioned above said base layer, each said container holding a porous medium;
   at least one vent channel positioned among said containers and extending between said leachate drainage layer and at least two of said container layers.

19. The landfill according to claim 18, further comprising at least one drain channel positioned between said base layer and said leachate drainage layer, said at least one drain channel being arranged transversely to and in fluid communication with said at least one vent channel.

20. The landfill according to claim 19, wherein said at least one drain channel comprises a perforated pipe.

21. The landfill according to claim 18, wherein said leachate drainage layer is formed of material selected from the group consisting of fine sand, gravel, glass particles, rubber particles and combinations thereof.

22. The landfill according to claim 18, further comprising an impermeable membrane positioned beneath said leachate drainage layer.

23. The landfill according to claim 22, wherein said impermeable membrane comprises high density polyethylene.

24. The landfill according to claim 18, further comprising a soil layer covering said leachate drainage layer.

25. The landfill according to claim 24, further comprising a substrate surrounding at least said base layer, said substrate being positioned between said soil layer and said base layer.

26. The landfill according to claim 25, wherein said substrate comprises a geotextile.

27. The landfill according to claim 24, further comprising a porous layer surrounding said base layer, said porous layer being positioned between said soil layer and said leachate drainage layer.

28. The landfill according to claim 27, wherein said porous layer comprises a layer of non-carbonate stones.

29. The landfill according to claim 27, wherein said at least one drain channel extends into said porous layer.

30. The landfill according to claim 18, further comprising a substrate overlying said top layer.

31. The landfill according to claim 30, wherein said substrate comprises a geotextile.

32. The landfill according to claim 18, wherein said at least one vent channel comprises a perforated pipe.

33. The landfill according to claim 18, further comprising a plurality of vent channels distributed among said containers.

34. The landfill according to claim 33, further comprising a plurality of drain channels positioned beneath said base layer, each of said drain channels being arranged transversely to and in fluid communication with at least one of said vent channels.

35. The landfill according to claim 34, wherein said vent channels and said drain channels comprise perforated pipe.

36. The landfill according to claim 18, wherein each said porous container comprises a wire cage.

37. The landfill according to claim 18, wherein said porous medium is selected from the group consisting of gravel, cobble and combinations thereof.

38. The landfill according to claim 37, wherein said porous medium ranges in size from ½ inch to 6 inches in diameter.

39. The landfill according to claim 18, further comprising at least two container layers between said base layer and said top layer.

40. The landfill according to claim 18, further comprising:
a waste matter layer covering said leachate drainage layer and said top layer;
a gas extraction well extending from a surface of said waste matter layer to said top layer.

41. The landfill according to claim 40, wherein said waste matter layer comprises:
a shaft extending through said waste matter layer;
a pipe positioned within said shaft, said pipe being in fluid communication with said leachate bed through said container layers;
a porous medium positioned within said shaft surrounding said pipe.

42. The landfill according to claim 41, wherein said porous medium comprises gravel.

43. The assemblage according to claim 18, further comprising at least one container layer between said base layer and said top layer.

* * * * *